No. 647,736. Patented Apr. 17, 1900.
J. D. WILKENS.
DENTAL HANDPIECE.
(Application filed Jan. 26, 1899.)
(No Model.)
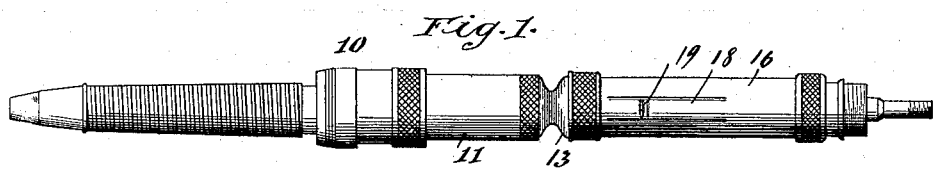
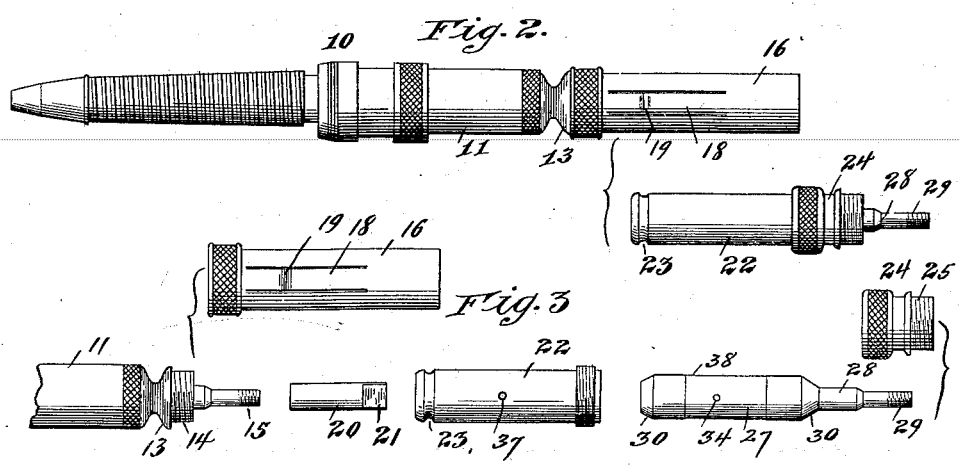
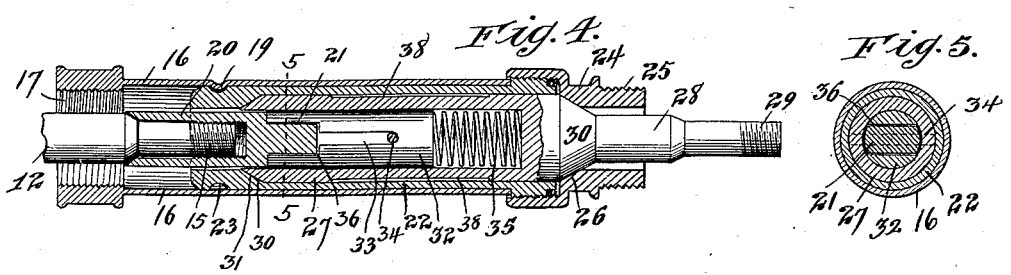
Witnesses,
Inventor,
John D. Wilkens,
By Offield, Towle & Linthicum,
Attys.

UNITED STATES PATENT OFFICE.

JOHN D. WILKENS, OF CHICAGO, ILLINOIS, ASSIGNOR TO THE DENTAL PROTECTIVE SUPPLY COMPANY OF THE UNITED STATES, OF SAME PLACE.

DENTAL HANDPIECE.

SPECIFICATION forming part of Letters Patent No. 647,736, dated April 17, 1900.

Application filed January 26, 1899. Serial No. 703,437. (No model.)

*To all whom it may concern:*

Be it known that I, JOHN D. WILKENS, of Chicago, in the county of Cook and State of Illinois, have invented certain new and useful Improvements in Dental Handpieces, of which the following is a specification.

This invention relates to dental handpieces, and has for its object to provide means whereby such handpieces can be immediately connected with and disconnected from their actuating-shaft. In using such instruments it is frequently the case that a practically-instantaneous change from one type of handpiece to another—as, for instance, from a "straight" handpiece, so called, to an angle handpiece—is desirable, while in practice it would require a considerable length of time to unscrew the first handpiece and screw the second one in place with the ordinary screw-joint connection commonly used. It is for the purpose of obviating this loss of time with the connection in common use and to enable the operator to couple and uncouple the parts by a direct longitudinal movement thereof toward and from each other that I have devised my present construction, which consists in certain novel features which I will now proceed to describe and will then particularly point out in the claims.

In the accompanying drawings, Figure 1 is a side elevation of a structure embodying my invention. Fig. 2 is a similar view showing the two parts disconnected at the joint. Fig. 3 is an illustrative view showing the several parts of the coupling separated. Fig. 4 is a longitudinal sectional view, on an enlarged scale, through the coupling; and Fig. 5 is a transverse sectional view taken on the line 5 5 of Fig. 4.

In the said drawings, 10 indicates a handpiece of any approved construction, comprising a stationary outer casing 11 and an internal revolving spindle 12, mounted in suitable bearings therein, the casing being provided with the usual terminal collet 13, threaded at 14 for connection with the coupling-shaft of the engine, while the spindle 12 is also threaded, as shown at 15, for connection with the rotating portion of said shaft. These parts may be of any approved construction usually employed in dental handpieces of this character.

The coupling proper, which forms the subject-matter of my invention, comprises two parts, one adapted for connection with the handpiece and the other for connection with the engine-shaft. The part connected with the handpiece consists of a sleeve or hollow cylinder 16, threaded internally at one end, as indicated at 17 in Fig. 4, to screw upon the threaded portion 14 of the collet 13. This sleeve 16 is provided with a resilient or elastic portion 18, having a locking projection 19 thereon for the purpose hereinafter set forth, and this resilient or elastic portion or tongue may be formed, if desired, by slitting the sleeve longitudinally along two parallel lines and depressing the metal of the strip thus partially detached, so as to form the projection 19, which extends toward the interior of the sleeve 16. The handpiece part of the coupling also comprises a rotating coupling member 20, which is threaded internally to screw upon the threaded portion 15 of the spindle 12, while its projecting end is polygonal or flattened at the sides, as indicated at 21, to cause it to engage with the other coupling member carried by the shaft and hereinafter described. The other part of the coupling, which may be termed the "engine" part, comprises a non-rotating sleeve 22, which fits snugly within the sleeve 16 and which is provided with a circumferential groove or recess 23 to receive the projection 19 of said sleeve 16. The construction of the parts is such that the two parts of the device may be united by simply inserting the one sleeve within the other until the projection 19 engages the groove 23, the two parts being held in engagement against ordinary force, but being separable by means of a pull of sufficient strength to disengage said projection from said groove. 24 indicates a collet threaded internally at one end to screw upon the correspondingly-threaded end of the sleeve 22, said collet being provided with an externally-threaded portion 25 at its other end to adapt it for connection with the coupling on the engine-shaft in the usual manner. This collet is provided internally with a conical bearing-surface 26. Mounted within the sleeve 22 is a hollow spindle 27, having an extension 28 outward beyond the collet 24 and threaded at its end, as shown at 29, for connection with the engine-shaft. The body of the spindle 27 is provided at its ends with conical bearing-surfaces 30, which are adapted to bear, respectively, against the bearing-surface 26 of the collet 24 and a similar bearing-surface 31 at the inner end of the sleeve 22. 32 represents the second coupling member which is mounted within the hollow interior of the spindle 27 and is free to move longitudinally therein but rotates along therewith. This rotative engagement may be obtained, as in the construction shown, by providing in the member 32 a longitudinal slot 33, with which engages a pin 34, extending through the spindle 27. A spring 35, seated in the recess in the spindle 27, bears against the member 32 and forces the same normally toward the open end of said spindle, or, in other words, toward the other coupling member 20. The coupling member 32 is provided in its outer or exposed end with a polygonal recess 36 of a shape adapting it to engage the corresponding projection 21 on the member 20, and in the construction shown this polygonal recess consists merely of a transverse slot which is adapted to receive and fit the flattened tongue 21.

It will be understood, of course, that in practice each handpiece which it is desired to use will be provided with the parts 16 and 20, while only one set of the remaining parts needs to be provided for attachment to the end of the flexible shaft of the engine. It will also be observed that the collet 24 and spindle 27 are finished at their ends in the same manner as the collet 13 and spindle 12 of the ordinary handpiece, so as to adapt them for direct connection with the end of the engine-shaft. The parts having been assembled by connecting the collet 24 and threaded terminal 29 of the spindle 27 with the corresponding parts of the engine-shaft, while the parts 16 and 20 are connected to the corresponding parts of the handpiece, the handpiece may be operatively connected with the engine by simply inserting the sleeve 22 in the sleeve 16 until the projection 19 engages the groove 23 and locks the two parts of the coupling together. During this insertion the coupling member 20 passes into the hollow interior of the sleeve 22 and also into the hollow interior of the spindle 27 and engages the other coupling member 32. In case the slot 36 is not presented in such a position as to permit immediate entrance thereinto of the tongue 21 the coupling member 32 will yield, and as it rotates will quickly assume a position permitting the engagement of the slot and tongue, whereupon the spring 35 will throw the member 32 forward into such engagement. While the parts are thus engaged it is obvious that rotary motion will be transmitted from the engine-shaft to the spindle 27 and from this latter to the spindle 12 of the handpiece. When it is desired to remove the handpiece and replace it with another one, such removal and replacing may be instantly accomplished by simply pulling the two members of the coupling directly apart and slipping on the other handpiece, which will immediately become operatively connected with the engine-shaft. The coupling is so constructed that it may be connected with and used as an intermediate device between the ordinary handpiece and engine-shaft as generally constructed, and by its use the various handpieces may be attached to and detached from the engine-shaft while this latter is in motion in a practically instantaneous manner and by a single direct motion.

Provision is made for taking up wear between the spindle 27 and sleeve 22, within which it bears, by means of the conical bearings 30 on the spindle and the corresponding bearings 31 on the sleeve and 26 on the collet 24. This adjustment is accomplished by reason of the threaded engagement of the collet with the sleeve, which permits said collet to have its bearing-surface 26 brought closer to the bearing-surface 31 at the opposite end of the sleeve, and thereby take up any wear which may occur between said bearing-surfaces and the conical bearing-surface 30 of the spindle. Provision is also made for lubrication between the spindle 27 and sleeve 22 by an aperture 37 through the sleeve, the spindle 27 being circumferentially reduced, as shown at 38, to form an oil-chamber. It is obvious that various modifications may be made without departing from the principle of my invention, and I therefore do not wish to be understood as limiting myself strictly to the precise details of construction hereinbefore described and shown in the drawings.

I claim—

1. A coupling for dental handpieces composed of two parts, one adapted for connection with the handpiece and the other adapted for connection with the engine-shaft, each part comprising a non-rotating sleeve and a rotating coupling member, the two sleeves being adapted to be engaged by a direct longitudinal motion, and the coupling members being adapted to automatically couple or interlock, the coupling member carried by the engine-shaft section being adapted to yield longitudinally when pressed against the other member in coupling the sections, substantially as described.

2. The combination, with the casing and spindle, of a dental handpiece, of a sleeve adapted to be connected to the casing and a coupling member adapted to be connected to the spindle, said sleeve being provided with an elastic or spring portion having a projection, a second sleeve adapted to fit and slide within the first-mentioned sleeve and having a groove or recess to receive the projection thereof, and a spindle mounted in said second sleeve and provided with a yielding coupling member to engage the first-mentioned coupling member, said second sleeve and spindle being adapted for connection with the engine-shaft and its coupling, substantially as described.

3. The combination, with a handpiece and its spindle, of a sleeve connected with the handpiece-casing, a coupling member connected with the spindle, and a second sleeve adapted for connection with the first-mentioned sleeve and provided with a hollow spindle having a spring-actuated coupling member longitudinally movable in said spindle but rotating therewith, said second sleeve and spindle being adapted for connection with the engine-shaft and its coupling, substantially as described.

4. The combination, with a dental handpiece and its spindle, of a sleeve adapted for connection with the handpiece-casing and a coupling member adapted for connection with the spindle, a second sleeve adapted to fit and engage the first-mentioned sleeve and carrying a coupling member to engage the first-mentioned coupling member, and means for taking up wear between said spindle and last-mentioned sleeve, substantially as described.

JOHN D. WILKENS.

Witnesses:
FREDERICK C. GOODWIN,
IRVINE MILLER.